United States Patent
Liu et al.

(10) Patent No.: US 10,412,061 B2
(45) Date of Patent: *Sep. 10, 2019

(54) METHOD AND SYSTEM FOR ENCRYPTED COMMUNICATIONS

(71) Applicant: Tencent Technology (Shenzhen) Company Limited, Shenzhen (CN)

(72) Inventors: Chenglin Liu, Shenzhen (CN); Jinhai Liu, Shenzhen (CN); Xiangyao Lin, Shenzhen (CN); Liangliang Fan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,100

(22) Filed: Nov. 16, 2018

(65) Prior Publication Data

US 2019/0089684 A1 Mar. 21, 2019

Related U.S. Application Data

(63) Continuation of application No. 14/992,825, filed on Jan. 11, 2016, now Pat. No. 10,164,949, which is a
(Continued)

(30) Foreign Application Priority Data

Mar. 11, 2014 (CN) .......................... 2014 1 0087935

(51) Int. Cl.
*H04L 9/08* (2006.01)
*H04L 29/06* (2006.01)
(Continued)

(52) U.S. Cl.
CPC ......... *H04L 63/0428* (2013.01); *H04B 1/385* (2013.01); *H04L 9/0822* (2013.01);
(Continued)

(58) Field of Classification Search
USPC ........ 713/150, 163, 171, 181; 726/2, 21, 36; 380/255, 264, 276
See application file for complete search history.

(56) References Cited

U.S. PATENT DOCUMENTS

| | | | |
|---|---|---|---|
| 2004/0034776 A1* | 2/2004 | Fernando | H04L 9/0825 713/171 |
| 2005/0235152 A1* | 10/2005 | Ozaki | H04L 9/0841 713/170 |
| 2007/0038853 A1* | 2/2007 | Day | H04L 63/0281 713/153 |

FOREIGN PATENT DOCUMENTS

| | | |
|---|---|---|
| CN | 101231737 A | 7/2008 |
| CN | 101247219 A | 8/2008 |
| | (Continued) | |

OTHER PUBLICATIONS

Tencent Technology, ISRWO, PCT/CN2014/091616, Feb. 11, 2015, 8 pgs.

(Continued)

*Primary Examiner* — Sharif E Ullah
(74) *Attorney, Agent, or Firm* — Morgan, Lewis & Bockius LLP

(57) ABSTRACT

Method and device of encrypting communication between a server and a peripheral device are disclosed. The method includes: a server receiving a session request from a control device, the session request including a predetermined device ID of a peripheral device associated with the control device; generating a first session key for encrypting and decrypting future communication between the peripheral device and the server; identifying a pre-stored encryption key correspond- (Continued)

ing to the predetermined device ID from a database, wherein the pre-stored encryption key is also pre-stored in the peripheral device; encrypting the first session key using the pre-stored encryption key; sending the encrypted first session key to the peripheral device via the control device; and encrypting communication to the peripheral device in a respective communication session using the first session key.

18 Claims, 10 Drawing Sheets

Related U.S. Application Data continuation of application No. PCT/CN2014/091616, filed on Nov. 19, 2014.

(51) Int. Cl.
*H04L 9/14* (2006.01)
*H04B 1/3827* (2015.01)
*H04L 29/08* (2006.01)
*H04M 1/725* (2006.01)

(52) U.S. Cl.
CPC .............. *H04L 9/14* (2013.01); *H04L 63/061* (2013.01); *H04L 67/142* (2013.01); *H04M 1/72527* (2013.01)

(56) References Cited

FOREIGN PATENT DOCUMENTS

| CN | 102497465 A | 6/2012 |
| CN | 103561023 A | 2/2014 |
| CN | 104144049 A | 11/2014 |

OTHER PUBLICATIONS

Tencent Technology, IPRP, PCT/CN2014/091616, Sep. 16, 2016, 6 pgs.

* cited by examiner

METHOD AND SYSTEM FOR ENCRYPTED COMMUNICATIONS

PRIORITY CLAIM AND RELATED APPLICATION

This application is a continuation application of U.S. patent application Ser. No. 14/992,825, entitled "METHOD AND SYSTEM FOR ENCRYPTED COMMUNICATIONS" filed on Jan. 11, 2016, which is a continuation application of PCT Patent Application No. PCT/CN2014/091616, entitled "METHOD AND SYSTEM FOR ENCRYPTED COMMUNICATIONS" filed on Nov. 19, 2014, which claims priority to Chinese Patent Application No. 201410087935.8, entitled "ENCRYPTED COMMUNICATION METHOD, SYSTEM, AND APPARATUS" filed on Mar. 11, 2014, all of which are incorporated by reference in their entirety.

FIELD OF THE TECHNOLOGY

The present application relates to the field of Internet technologies, and in particular, to an encrypted communication method, system, and apparatus.

BACKGROUND

Wearable devices, such as intelligent watches, intelligent glasses, headsets, have great potential of providing convenience and functions that smart phones are hard to match. However, due to the limitation of design, size and specification, wearable devices may not support as many types of connection technology as smart phones. As a result, wearable devices may rely on smart phones to provide connections to remote servers. Wearable device and the servers send communications to smart phones and smart phones forward these communications to the intended servers and wearable devices.

In addition, it often occurs that a computing device, such as a tablet, a smart phone, a laptop, a wearable device, a desktop computer, cannot connect with Internet in certain circumstances and must rely on another computing device to provide the connection. For example, a laptop connects with the smart phone with a USB cable and uses the data plan of the smart phone to access the Internet.

In both cases, the security of the communication is threatened due to the addition of another layer of computing devices in communication. For example, the security of smart phones may be compromised by malicious software which may intercept communication between the smart watches and the servers. Security concern is especially unsettling when sensitive data is being communicated. For example, wearable devices may communicate private health data to a server in cloud. For another example, a user access bank accounts using a laptop which is connected to Internet through a tablet.

Therefore, it is desirable to have a method of establishing an encrypted communication between the devices and the servers, which immunes from the interception risks from the devices providing Internet connections.

SUMMARY

In accordance with some implementations of the disclosed technology, a method of encrypting communication between a server and a peripheral device is disclosed. The method comprises: a server receiving a session request from a control device (e.g., the client device in FIG. 5), the session request including a predetermined device ID of a peripheral device (e.g., the headset in FIG. 5) associated with the control device, and requesting a session key for encrypting communication between the peripheral device and the server; in response to the session request, generating a first session key for encrypting and decrypting future communication between the peripheral device and the server; in accordance with the predetermined device ID, identifying a pre-stored encryption key corresponding to the predetermined device ID from a database, wherein the pre-stored encryption key is also pre-stored in the peripheral device; encrypting the first session key using the pre-stored encryption key; sending the encrypted first session key to the peripheral device via the control device, wherein the encrypted first session key is configured to be decrypted by the peripheral device using the pre-stored encryption key; and encrypting communication to the peripheral device in a respective communication session using the first session key.

In another aspect, a device (e.g., a server in FIG. 5) comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

Corresponding methods performed on the client device and the peripheral device are also disclosed and/or are apparent to a person ordinarily skilled in the art in light of the disclosure provided herein. Other aspects and advantages of the methods provided herein are apparent in light of the following disclosure.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

To illustrate the technical solutions in accordance with some embodiments or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in accordance with some embodiments with reference to the accompanying drawings in accordance with some embodiments. Apparently, the described embodiments are merely a part rather than all of the embodiments of the present application. All other embodiments obtained by a person of ordinary skill in the art based on the embodiments of the present application without creative efforts shall fall within the protection scope of the present application.

In accordance with some embodiments, a client may be any client software, for example, an instant messaging client, a game client, an audio-video client, a picture processing client, or an email client, that runs in a control device. In addition, the control device is an intelligent device with a network function, such as a tablet computer, a mobile phone, an electronic reader, a remote control, a personal computer (PC), a notebook computer, a vehicle-mounted device, a network TV, or a wearable device. Further, a peripheral device may be any device that can communicate with the client, for example, an earphone, a microphone, a sound box, vehicle-mounted device, a network TV, a wearable device, a tablet computer, a mobile phone, an electronic reader, or a remote control. A device ID of the peripheral device may be a unique identifier of the peripheral device.

Figure 1:
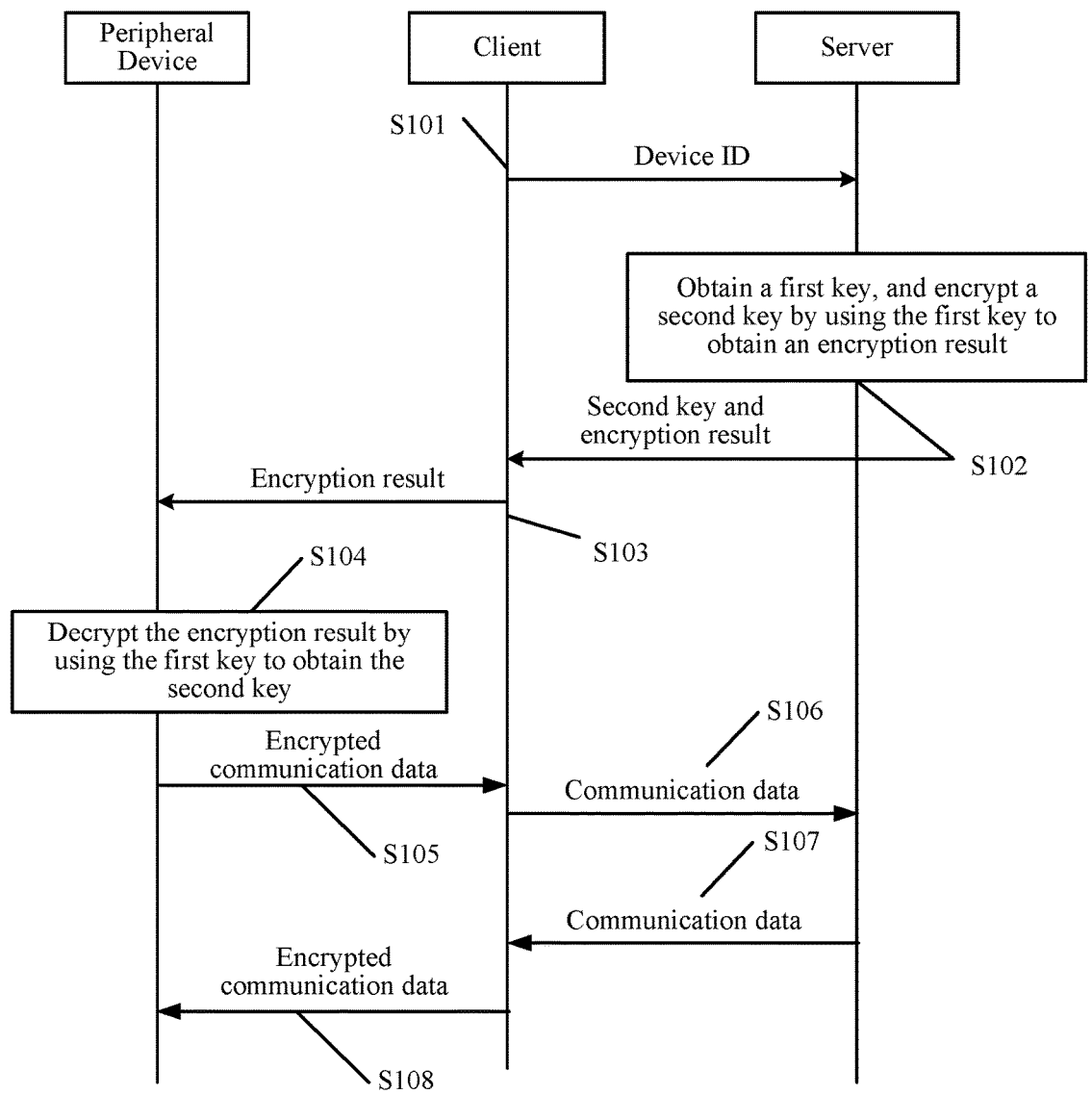
FIG. 1 is a schematic diagram of an encrypted communication method in accordance with some embodiments.

FIG. 1 is a schematic diagram of an encrypted communication method in accordance with some embodiments. As shown in FIG. 1, the method includes the following steps.

In accordance with some embodiments, in step S101, a client sends a device ID of a peripheral device to a server.

Optionally, the client may receive the device ID sent by the peripheral device, and may also receive a device ID sent from a local peripheral device.

In accordance with some embodiments, in step S102, the server obtains a first key corresponding to the peripheral device, encrypts a second key by using the first key to obtain an encryption result, and then sends the second key and the encryption result to the client, where the second key is a key generated for the peripheral device by the server.

Optionally, the server may obtain in advance the first key corresponding to the peripheral device. For example, the server generates in advance the first key for the peripheral device, or the server coordinates in advance with the peripheral device to generate the first key. After receiving the device ID of the peripheral device, the server may search locally for the first key corresponding to the peripheral device, and then encrypts the second key by using the first key to obtain the encryption result. An encryption manner includes, but is not limited to, advanced encryption standard (AES) encryption. For example, encryption is performed by using an AES-128 standard or an AES-256 standard. In addition, the second key may be a key that is generated by the server for the peripheral device after the server obtains the first key, and is only valid within a specific time.

In accordance with some embodiments, in step S103, the client sends the encryption result to the peripheral device and stores the second key.

In accordance with some embodiments, in step S104, the peripheral device decrypts the encryption result using the first key obtained in advance to obtain the second key.

The peripheral device may obtain the first key in advance, for example, receiving in advance the first key sent by the server, or coordinating in advance with the server to generate the first key. After obtaining the encryption result, the peripheral device may decrypt the encryption result by using the first key to obtain the second key.

In accordance with some embodiments, in step S105, the peripheral device encrypts communication data by using the second key to obtain encrypted communication data, and transmits the encrypted communication data to the client.

In accordance with some embodiments, in step S106, the client decrypts the encrypted communication data by using the second key to obtain the communication data, and then transmits the communication data to the server.

Optionally, the method may include: in step S107, the client receives communication data sent by the server, encrypts the communication data by using the second key to obtain encrypted communication data, and then transmits the encrypted communication data to the peripheral device; and in step S108, the peripheral device decrypts the encrypted communication data by using the second key to obtain the communication data.

Optionally, the server may be a server providing a resource for the client. For example, the client is an instant messaging application and the server is an instant messaging server. The client is a game client and the server is a game server. Or the server is a server authenticated by the client. In this way, when communication between the client and the server is secure, data transmitted between the client and the server does not need to be encrypted, and only data transmitted between the peripheral device and the client is encrypted, thereby saving power consumption of the client and the server under the precondition of ensuring communication data security.

Figure 2:
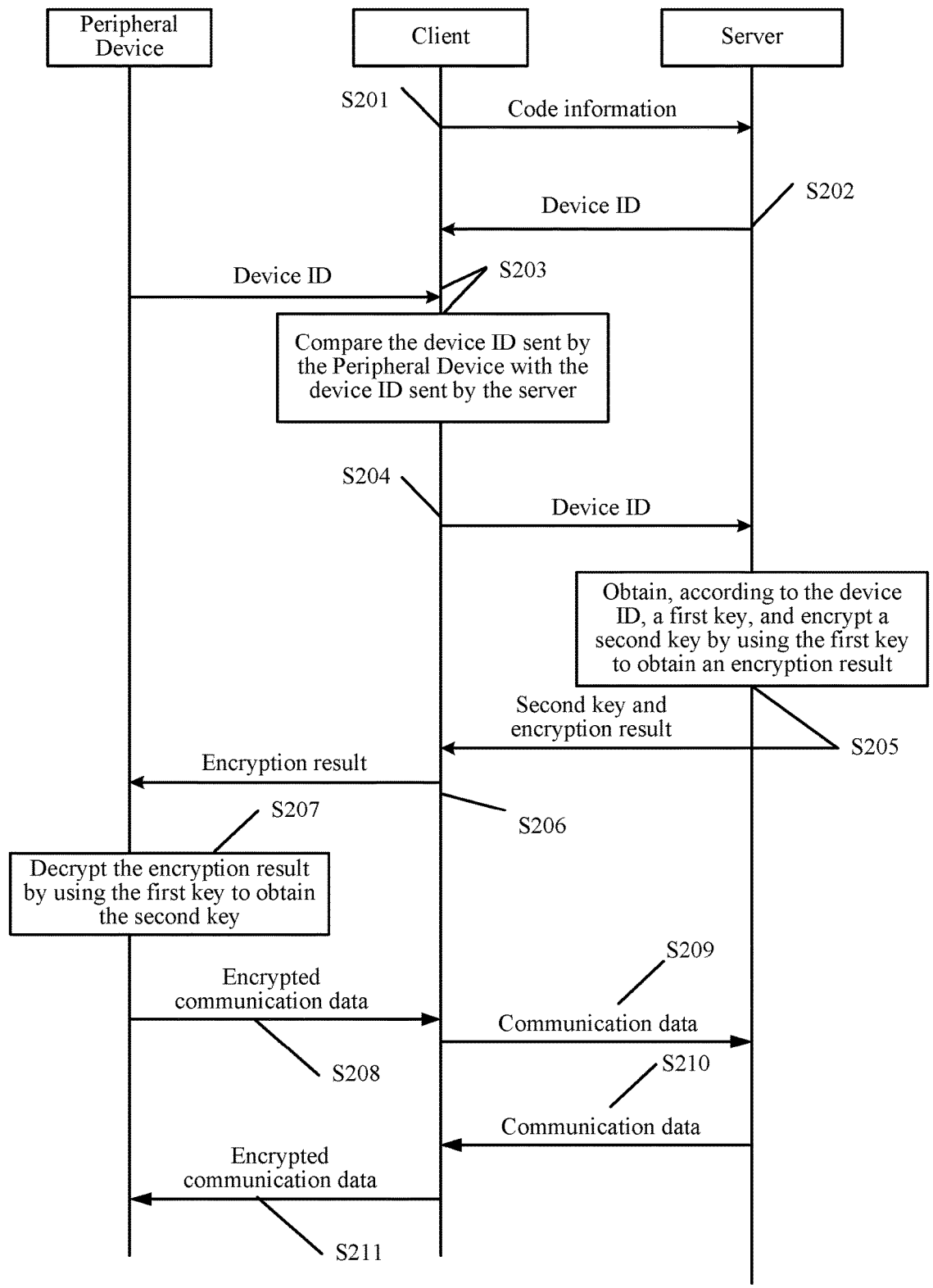
FIG. 2 is a schematic diagram of an encrypted communication method in accordance with some embodiments.

FIG. 2 is a schematic diagram of another encrypted communication method in accordance with some embodiments. As shown in FIG. 2, the method includes the following steps.

In accordance with some embodiments, in step S201, a client scans a graphic code displayed by a peripheral device, decrypts the graphic code to obtain code information, and then sends the code information to a server, where the code information is character information generated by the server for the peripheral device.

Optionally, the server may allocate the code information to the peripheral device in advance. The code information is in a one-to-one correspondence to the peripheral device, that is, the code information uniquely indicates the peripheral device, and in this way, when receiving the code information, the peripheral device may perform graphic code computation on the code information to obtain the graphic code.

In accordance with some embodiments, the server may send the graphic code to the peripheral device in advance. When the client needs to obtain the graphic code of the peripheral device, step S201 may be performed. Optionally, the code information may be a group of character strings.

In accordance with some embodiments, in step S202, the server searches for a device ID of the peripheral device, corresponding to the code information; and then sends the device ID to the client.

In accordance with some embodiments, in step S203, the client receives a device ID of the peripheral device sent by the peripheral device; then compares the device ID sent by the peripheral device with the device ID sent by the server; when the device IDs are consistent, performs step S204; and when the device IDs are inconsistent, ends the procedure.

Optionally, before step S203, the server sends the device ID of the peripheral device to the client. When performing step S203, the client receives the device ID sent by the peripheral device. In this way, the client may compare the device ID sent by the server with the device ID sent by the peripheral device, and when the comparison result is that the device IDs are consistent, perform step S204. Because transmission between the client and the server is highly secure, when the device ID sent by the peripheral device is the same as the device ID sent by the server, the client may determine that the peripheral device is a secure device.

In accordance with some embodiments, in step S204, the client sends the device ID of the peripheral device to the server.

Optionally, step S204 may include: receiving device information that carries the device ID of the peripheral device and is sent by the target terminal, obtaining the device ID from the device information, and then sending the device ID to the server.

In some embodiments, the device information is a hash value obtained by performing MD5 computation on the device ID. When receiving the device information, the client may obtain the device ID through inverse computation of the MD5 computation. In this implementation manner, the device ID is transmitted between the peripheral device and the client through the device information of the hash computation, so security of information transmission between the peripheral device and the client can be improved.

Optionally, in some embodiments, communication between the client and the peripheral device may be performed through a physical link. The physical link includes, but is not limited to, a Bluetooth link, a near field communication (NFC) link, a universal serial bus (USB) link, an audio port link, and the like.

Figure 3:
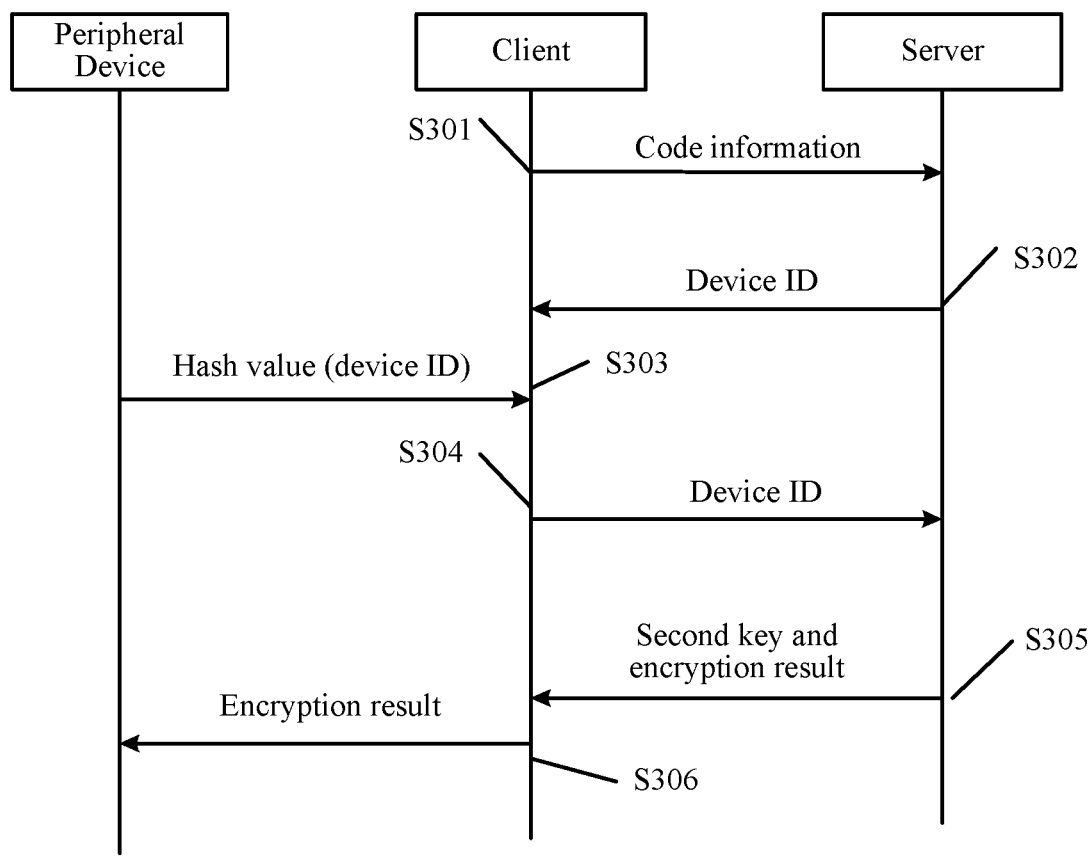
FIG. 3 and FIG. 4 are each a schematic diagram of optional data transmission in accordance with some embodiments.
Figure 4:
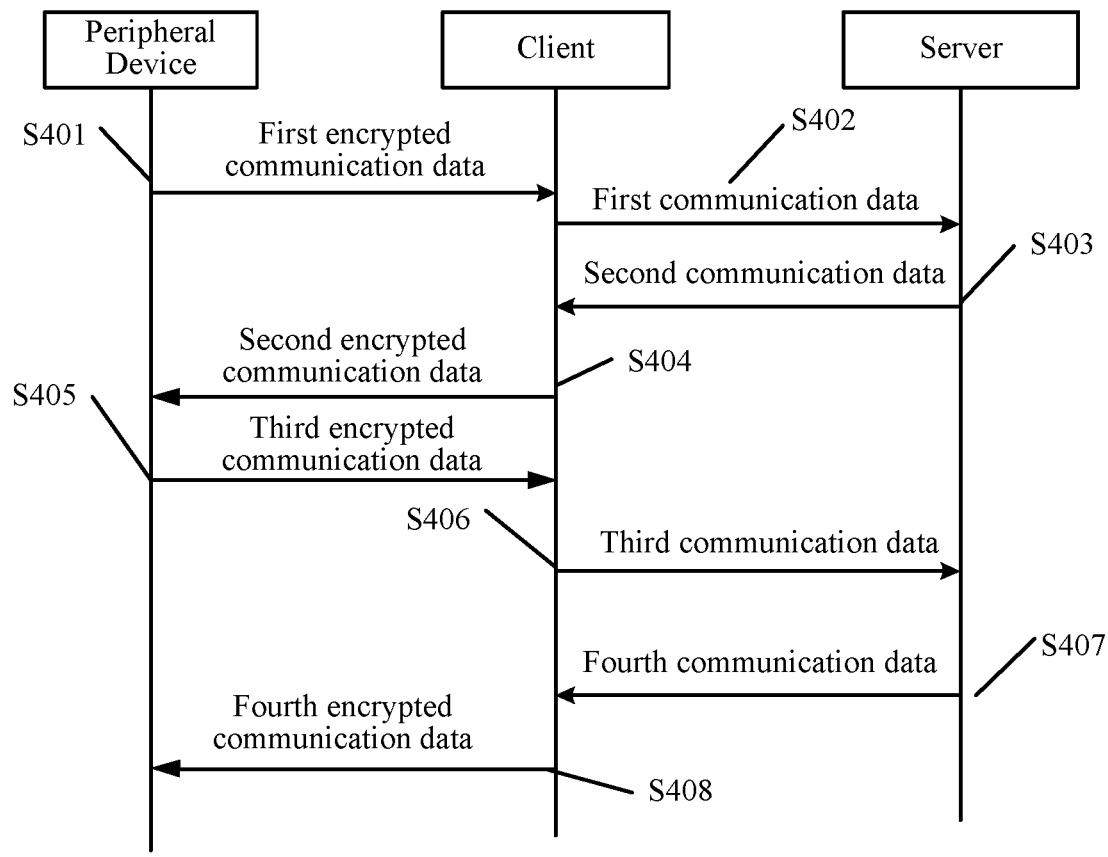

FIG. 3 and FIG. 4 are specific application examples in accordance with some embodiments.

In accordance with some embodiments, in step S302, the server searches for a device ID of the peripheral device, corresponding to the code information; and then sends the device ID to the client.

In accordance with some embodiments, in step S303, the peripheral device sends a hash value to the client, where the hash value is obtained by performing hash computation on the device ID of the peripheral device.

In accordance with some embodiments, in step S304, the client parses the hash value to obtain a device ID of the peripheral device, and then sends the device ID to the server.

In accordance with some embodiments, in step S305, the server obtains a first key corresponding to the peripheral device, performs AES encryption on a second key by using the first key to obtain an encryption result, and then sends the second key and the encryption result to the client.

In accordance with some embodiments, in step S401, the peripheral device sends first encrypted communication data to the client, where the first encrypted communication data is data obtained by performing AES encryption on first communication data by using the second key.

In accordance with some embodiments, in step S402, the client decrypts the first encrypted communication data by using the second key to obtain the first communication data, and then transmits the first communication data to the server.

In accordance with some embodiments, in step S403, the server returns second communication data to the client in responds to the first communication data.

In accordance with some embodiments, in step S404, the client performs AES encryption on the second communication data by using the second key to obtain second encrypted communication data, and sends the second encrypted communication data to the peripheral device.

In accordance with some embodiments, in step S405, the peripheral device decrypts the second encrypted communication data by using the second key to obtain the second communication data, generates third communication data responding to the second communication data, then performs AES encryption on the third communication data by using the second key to obtain third encrypted communication data, and sends the third encrypted communication data to the client.

In accordance with some embodiments, in step S406, the client decrypts the third encrypted communication data by using the second key to obtain the third communication data, and then transmits the third communication data to the server.

In accordance with some embodiments, in step S407, the server returns fourth communication data to the client in responds to the third communication data.

In accordance with some embodiments, in step S408, the client performs AES encryption on the fourth communication data by using the second key to obtain fourth encrypted communication data, and sends the fourth encrypted communication data to the peripheral device.

Figure 5:
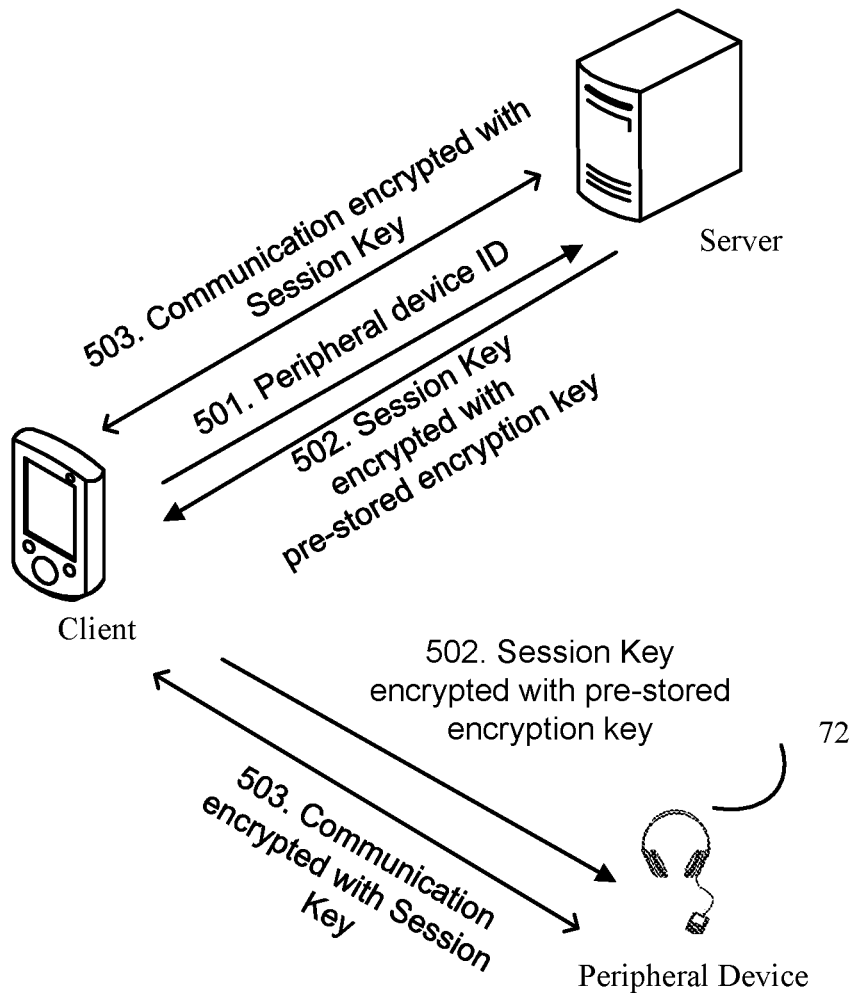
FIG. 5 is a schematic structural diagram of an encrypted communication system in accordance with some embodiments.

FIG. 5 is a schematic structural diagram of an encrypted communication system and encrypted information flow within the system. Both the server and the peripheral device 72 include the same pre-stored encryption key. In accordance with some embodiments, in a step 501, the server acquires the device ID of peripheral device from the control device and identifies a pre-stored encryption key associated with the device ID. In a step 502, the server generates a session key for the peripheral device, encrypts the session key using the pre-stored encryption key associated with the device ID of the peripheral device, and sends the encrypted session key to the peripheral device through the control device. The peripheral device then decrypts the session key using the locally stored copy of the pre-stored encryption key. The server and the peripheral device can then encrypt communicate using the session key, and the encrypted communication can be transmitted through the control device without the communication being exposed to the control device (e.g., because the control device does not have the session key).

Figure 6:
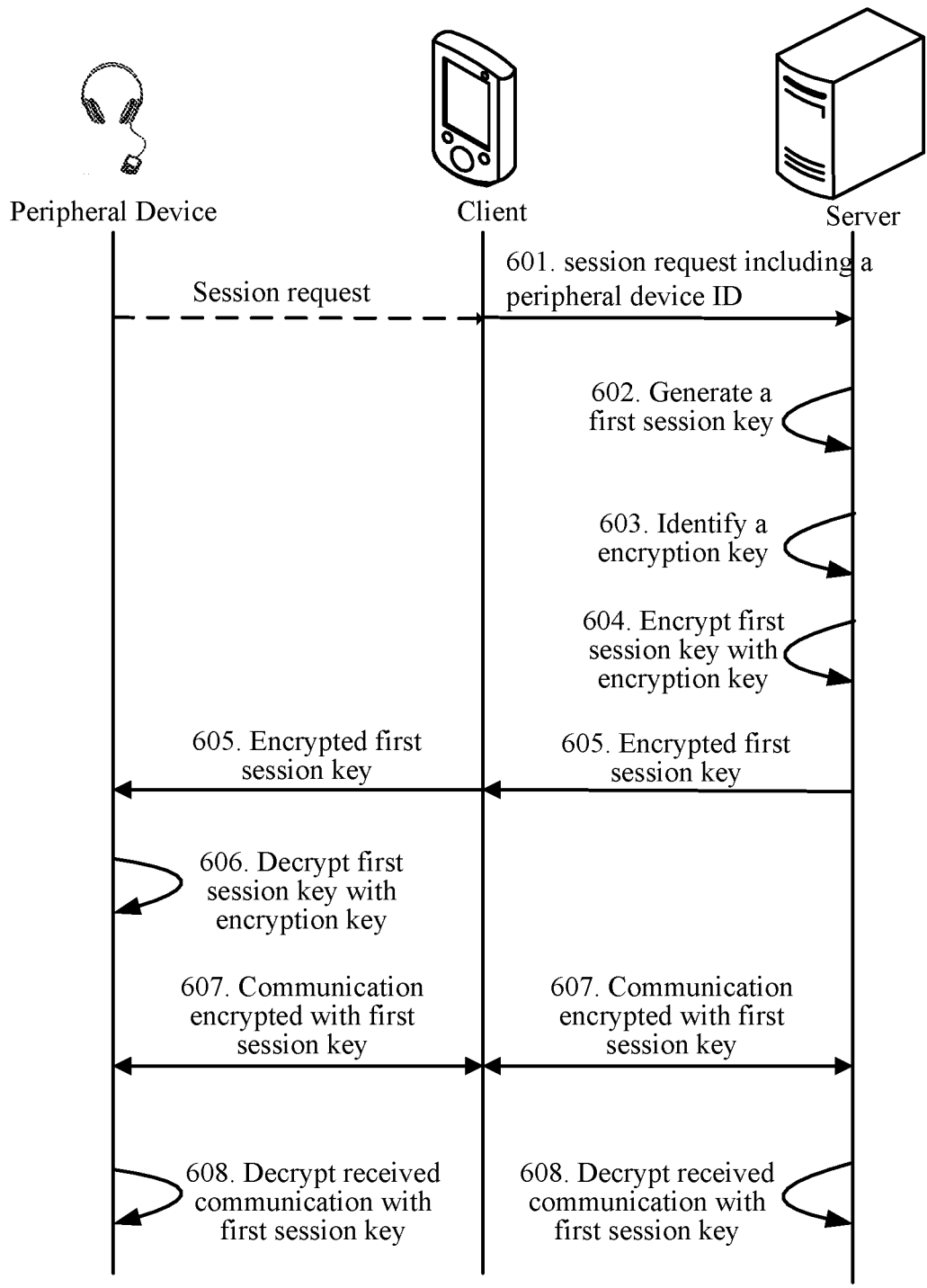
FIG. 6 is a schematic flowchart of a method of encrypting communication between a server and a peripheral device in accordance with some embodiments.

FIG. 6 is a flowchart of a method of encrypting communication between a server and a peripheral device within the system as illustrated in FIG. 5. The method is performed by the server having one or more processors and memory having instructions stored thereon, the instructions, when executed by the processors, cause the processors to perform the method.

In accordance with some embodiments, the server is a server providing social network platform and the control device is a computing device running an application of the social network. Both control device and peripheral device can be intelligent, complex and operating independently from each other. Control devices and peripheral devices are defined by their roles in communication rather than by their complexity. The roles of control device and peripheral device may also be reversed for different scenarios. For example, in one scenario, a laptop connects with a server through a tablet, so that the laptop is a peripheral device and the tablet is a control device; in another scenario, the tablet connects with the server through the laptop, so that the tablet is the peripheral device and the laptop is the control device.

In accordance with some embodiments, in the registration stage, the server receives a device registration request from the control device, the device registration request includes the predetermined device ID and a user identifier associated with the control device; and in response to the device registration request, the server associates the predetermined device ID with the user identifier; and processes the device registration request as a session request.

In accordance with some embodiments, in the initial registration process, the user may register the peripheral device to bind it with the user's accounts, such as user's social network account, email account, user account for websites. For example, the user can scan the QR code on the peripheral device, and the social network app obtains the device ID from the QR code and sends the registration request to the server. The server can also verify other information (such as registration confirmation) to make sure that the user of the control device indeed purchased the peripheral device rather than just scanning a peripheral device on display in a store. In accordance with some embodiments, when the user registers the device for the first time, that registration request is used as the very first session request.

In accordance with some embodiments, in a step 601, the server receives a session request from a control device, the session request including a predetermined device ID of a peripheral device associated with the control device, and requesting a session key for encrypting communication between the peripheral device and the server.

In accordance with some embodiments, the peripheral device initiates the session request and the control device forwards the session request to the server. For example, the peripheral device is a smart watch and begins to transmit the user's heart rate and movement data to the server once the user begins to exercise. The smart watch sends the session request to a smart phone and the smart phone forwards the session request to the server.

In accordance with some embodiments, the session request includes the client ID of the control device or the social network account and any other logon information that is needed to verify the identity of the user of the control device. In some embodiments, the control device has already been connected with the server when sending the session request. In some embodiments, the control device is not connected with the server until sending the session request, and the session request includes a request to establishing a connection and necessary authentication information.

In accordance with some embodiments, the control device initiates the session request and sends the request to both the server and the peripheral device. Therefore, the request for the session key can be made by the control device without explicit prompt from the peripheral device. In an initial setup process, the control device has been programmed to make the request for the session key on behalf of the peripheral device, without any explicit request from the peripheral device. For example, a user wants to watch a movie on smart glass with stream downloading from the server. The user uses the smart phone to download the movie from the server in stream and to turn the smart glass into movie watching mode. In some embodiments, the control device pre-stores the device ID of the peripheral device and does not have to obtain the device ID from the peripheral device.

In accordance with some embodiments, in a step 602, in response to the session request, the server generates a first session key for encrypting and decrypting future communication between the peripheral device and the server. In some embodiments, the first session key expires when the session ends.

In accordance with some embodiments, in a step 603, in accordance with the predetermined device ID, the server identifies a pre-stored encryption key corresponding to the predetermined device ID from a database, wherein the pre-stored encryption key is also pre-stored in the peripheral device.

In accordance with some embodiments, the server and the peripheral device both store a device ID of the peripheral device and an encryption key. The server pre-stores the device ID of the peripheral device, the encryption key and the corresponding relationships among the peripheral device IDs and the encryption keys in a database. Each pre-stored encryption key corresponds to at least one peripheral device ID of peripheral devices.

In some embodiments, the encryption key is a password or derived from a password. The user may first register the password in a website hence inputs the encryption key and its corresponding device ID into the database. The user then inputs the encryption key into the peripheral device.

In some embodiments, the encryption key is embedded in the peripheral device in manufacturing. The encryption key is provided to the database during or after the manufacturing.

In accordance with some embodiments, in a step 604, the server encrypts the first session key with the pre-stored encryption key. In accordance with some embodiments, the server encrypts a response including the first session key. The response includes an answer to the session request as well as the first session key. In some embodiments, the server encrypts the whole response, including the first session key.

In accordance with some embodiments, in a step 605, the server sends the encrypted first session key to the peripheral device via the control device, wherein the encrypted first session key is configured to be decrypted by the peripheral device using the pre-stored encryption key.

In accordance with some embodiments, in a step 606, the peripheral device decrypts the first session key using the pre-stored encryption key. Therefore, after the step 606, both the server and the peripheral device, but not the control device, possesses the first session key.

In accordance with some embodiments, in steps 607 and 608, the server and the peripheral device use the first session key to encrypt communication sent to each other and to decrypt communication received from each other. In some embodiments, all communication between the server and the peripheral device is sent through the control device. In some embodiments, the server may be able to send the communication to another control device that is currently connected to the peripheral device. For example, if the session set up process is completed on the phone, the later communication can be send to the peripheral device via an iPad. In some embodiments, the server, the control device and the peripheral device are all able to terminate a session.

The connection between the control device and the peripheral device can be a direct connection (e.g., via Bluetooth, Wi-Fi, or various wired connections). In some cases, the connection between the peripheral device and the control device can also be through a different server.

In accordance with some embodiments, the device ID of the peripheral device is included in the first communication sent by the peripheral device. The server may communicate with multiple peripheral devices simultaneously, and obtaining the device ID enables the server to identify the corresponding pre-stored encryption key used to decrypt communication.

In accordance with some embodiments, after sending the encrypted first session key to the peripheral device via the control device, the server receives first communication that is sent from the peripheral device via the control device and encrypted with the first session key by the peripheral device, the first communication is accompanied by the predetermined device ID of the peripheral device; based on the predetermined device ID accompanying the first communication, the server identifies the first session key in accordance with a stored association between the predetermined device ID and the first session key; and with the identified first session key, the server decrypts the first communication that is sent from the peripheral device via the control device. The device ID can be tagged onto the first communication when the control device forwards the first communication to the server. Both the device ID and the first communication can be encrypted by the control application (e.g., the social network app) on the control device, and that encryption is decrypted by the server based on the key shared between the control program and the server. In some embodiments, every communication is accompanied by the predetermined device ID of the peripheral device.

In accordance with some embodiments, when a peripheral device is the only peripheral device connected with a particular control device, the peripheral device does not send the device ID in the communication. Rather, either the control device stores the ID and sends it along with every communication to the server, or the server stores the ID and associates the ID with the particular control device. In accordance with some embodiments, the server recognizes the control device or the social network account on the control device and identifies the first session key in accordance with a stored association between the predetermined device ID and the first session key.

It should be noted that, in accordance with some embodiments, all communication between the control device and the server can be encrypted using the own encryption method of the control device. For example, the control device runs a social network communication application. The application encrypts communication with the social network server. In some embodiments, the encryption of communication between the control device and the server is transparent to the peripheral device. Similarly, communication between the control device and the peripheral device may be encrypted independently, and such encryption is transparent to the server.

In accordance with some embodiments, in response to the session request, the server generates a second session key different from the first session key. The server then sends the second session key to the peripheral device via the control device, wherein the control device retains a copy of the second session key, and wherein the peripheral device encrypts at least part of the communication to the server using the second session key and the control device decrypts the respective at least part of the communication using the retained copy of the second session key. For example, a user's smart watch connects with the server through the user's smart phone. The smart watch uploads two type of data to the server, the user's running data (distance, speed, route, etc.) just now and the health data of the user including detailed hear rates at different running speed. The user wants to save the health data in the server only and save the running distance and speed in the smart phone so that the user can share the running distance and speed with social network friends. The peripheral device then encrypts the health data using the first session key and the running data using the second session key. The control device (the smart phone) then decrypts the running data using the second session key.

In accordance with some embodiments, the second session key is sent to the control device without being encrypted by the pre-stored encryption key first. The second session key and the encrypted first session key are sent from the server to the control device in a secure way, i.e., encrypted by a key that is shared between the server and the control device. But the control device is able to obtain the plaintext version of the second session key (e.g., by decrypting the outermost layer of encryption), but it only has the encrypted version of the first session key. The second session key can be sent to the control device in two separate packages or in the same package. For example, the control device can receive a first package with just the second session key, and a second package with the first and second session keys encrypted using the pre-stored key.

Alternatively, in accordance with some embodiments, the control device can receive a single package that includes the plaintext second session key, and the encrypted first session key. In such a case, the control device forwards the package to the peripheral device but keeps a copy of the plaintext second session key.

In accordance with some embodiments, in response to the session request, the server generates a second session key in addition to the first session key, wherein the first session key is configured to be capable of decrypting information encrypted using the second session key, and the second session key is configured to be incapable of decrypting information encrypted using the first session key. The server then sends the second session key to the control device, and encrypts at least part of the communication to the peripheral device using the second session key, wherein the respective at least part of the communication is configured to be decrypted by the control device using the second session key and by the peripheral device using the first session key. Notes that there is a difference in the first session key and the second session key. The first session key is used to encrypt communication by the server and the peripheral device. The second session key is retained by the control device to decrypt part of the communication between the server and the peripheral device. In this way, the server and the peripheral device can encrypt the communication while permitting part of the communication to be decrypted by the control device.

One way of the server constructing such session keys is that the first session key contains two parts, an X part and the second session key. In encryption, the part of communication is designed to be decrypted by the control device is encrypted by the second session key and the rest is encrypted by the X part.

In accordance with some embodiments, the server does not generate a second session key but instead sends part of the communication received from the peripheral device to the control device. During a communication session, the server receives encrypted session communication from the peripheral device via the control device; decrypts the session communication using the first session key; selects part of the session communication in accordance with predetermined criteria; and sends the respective part of the session communication to the control device. In the user running example, the server would send the decrypted running data, but not the health data, to the control device.

In accordance with some embodiments, the server allows a user to update the pre-stored encryption key. In some embodiments, the user operates on the peripheral device to enter or generate an updated encryption key (e.g., by typing a new password). The server receives a key updating request that is encrypted with the first session key and sent from the peripheral device via the control device, the key updating request including an updated encryption key corresponding to the predetermined device ID, and the key updating request is accompanied by the predetermined device ID of the peripheral device. The server obtains the updated encryption key corresponding to the predetermined device ID by decrypting the key updating request using the first session key, and replaces the pre-stored encryption key with the update encryption key in the database.

In accordance with some embodiments, the encrypted portion of the request does not include the device ID. Instead, the control device adds the device ID when forwarding the key updating request to the server. In some embodiments, the server identifies the device ID of the peripheral device through the ID of the control device or logon information of an application running on the control device.

Figure 7:
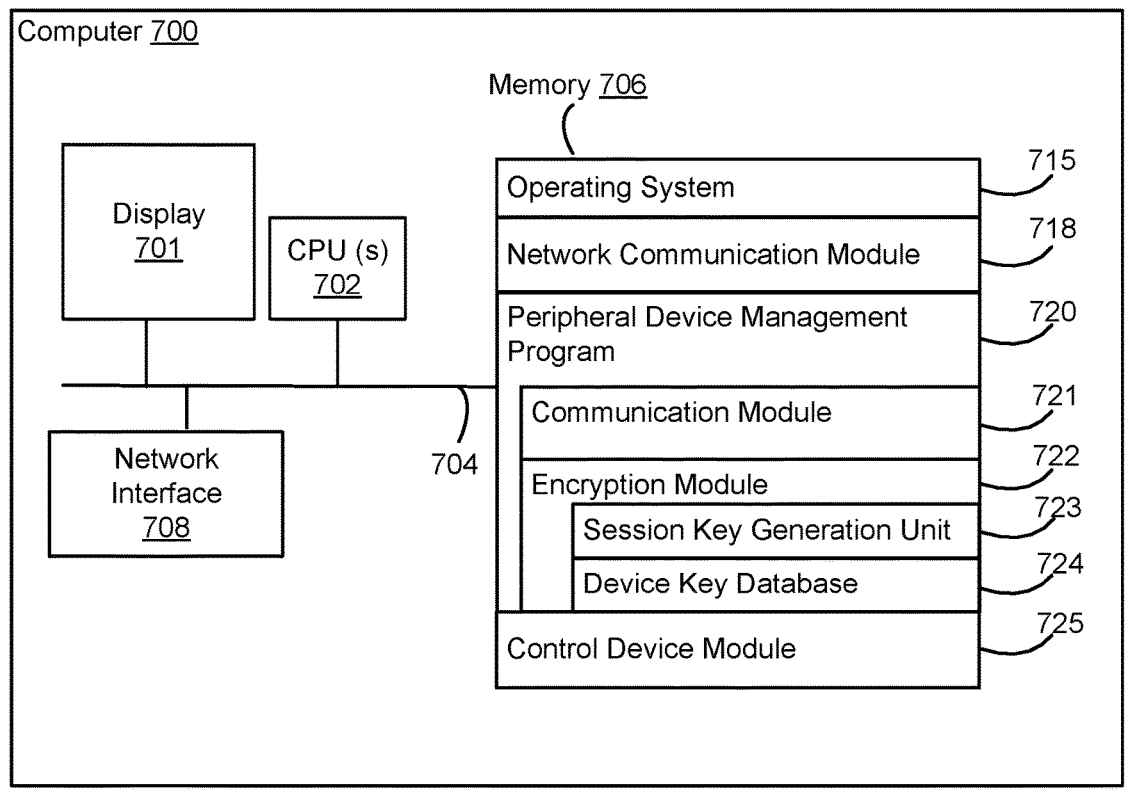
FIG. 7 is a diagram of an example implementation of a server in accordance with some embodiments.

FIG. 7 is a diagram of an example implementation of a server 700 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the server 700 includes one or more processing units (CPU's) 702, one or more network or other communications interfaces 708, a display 701, memory 706, and one or more communication buses 704 for interconnecting these and various other components. The communication buses may include circuitry (sometimes called a chipset) that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 may optionally include one or more storage devices remotely located from the CPU(s) 702. The memory 706, including the non-volatile and volatile memory device(s) within the memory 706, comprises a non-transitory computer readable storage medium.

In some implementations, the memory 706 or the non-transitory computer readable storage medium of the memory 706 stores the following programs, modules and data structures, or a subset thereof including an operating system 716, a network communication module 718, a peripheral device management program 720, and a control device module 725.

In accordance with some embodiments, the operating system 716 includes procedures for handling various basic system services and for performing hardware dependent tasks.

In accordance with some embodiments, the network communication module 718 facilitates communication with other devices via the one or more communication network interfaces 708 (wired or wireless) and one or more communication networks, such as the internet, other wide area networks, local area networks, metropolitan area networks, and so on.

In accordance with some embodiments, the peripheral device management program 720 provides communication with peripheral devices through network communication module 718. In some embodiments, the peripheral device management program comprises a communication module 721 and an encryption module 722. The communication module 721 is configured to communicate with control devices through the control device module 725, including receiving session requests, sending responses to session requests and sending and receiving communications. The encryption module 722 provides encryption and decryption for communication with the peripheral devices. The encryption module 722 includes a session key generation unit 723 and a device key database 724. The session key generation unit 723 generates the first session key and/or the second session key as being instructed by the encryption module 722. The device key database 724 stores the encryption keys for peripheral devices, the device IDs of peripheral devices and the corresponding relationships between the IDs and the encryption keys. After receiving device IDs, the encryption module 722 identifies the encryption keys corresponding to these IDs, and encrypts session keys with identified encryption keys.

In accordance with some embodiments, the control device module 725 is configured to communicate with the control device through the network communication module 718. The control device module 725 also sends and receives communication with peripheral devices that are connected with the control devices.

Figure 8:
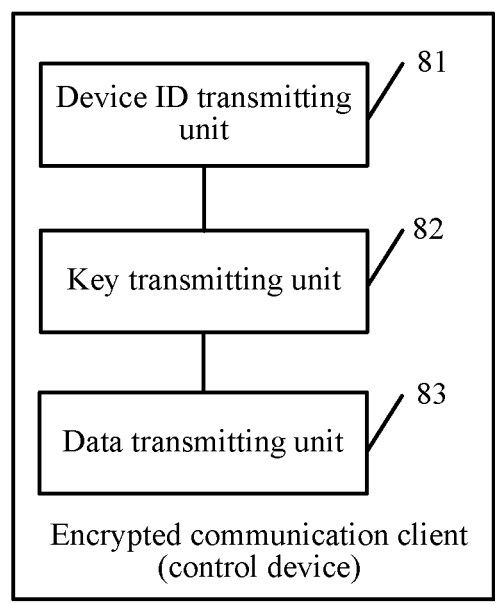
FIG. 8 is a schematic structural diagram of an encrypted communication client (control device) in accordance with some embodiments.

FIG. 8 is a schematic structural diagram of an encrypted communication client in accordance with some embodiments. As shown in FIG. 8, the client includes: a device ID transmitting unit 81, a key transmitting unit 82, and a data transmitting unit 83.

The device ID transmitting unit 81 is used to send a device ID of a peripheral device to a server, so that the server obtains a first key corresponding to the peripheral device, and encrypts a second key by using the first key to obtain an encryption result, where the second key is a key generated for the peripheral device by the server.

The key transmitting unit 82 is used to receive the second key and the encryption result sent by the server, store the second key, and send the encryption result to the peripheral device, so that the peripheral device decrypts the encryption result by using the first key obtained in advance to obtain the second key.

Optionally, the device ID transmitting unit 81 may be further used to receive the device ID of the peripheral device sent by the target terminal, and then send the device ID to the server.

Optionally, the device ID transmitting unit 81 may be further used to receive device information that carries the device ID of the peripheral device and is sent by the target terminal, obtain the device ID from the device information, and then send the device ID to the server, where the device information is information obtained by performing specific computation on the device ID.

Figure 9:
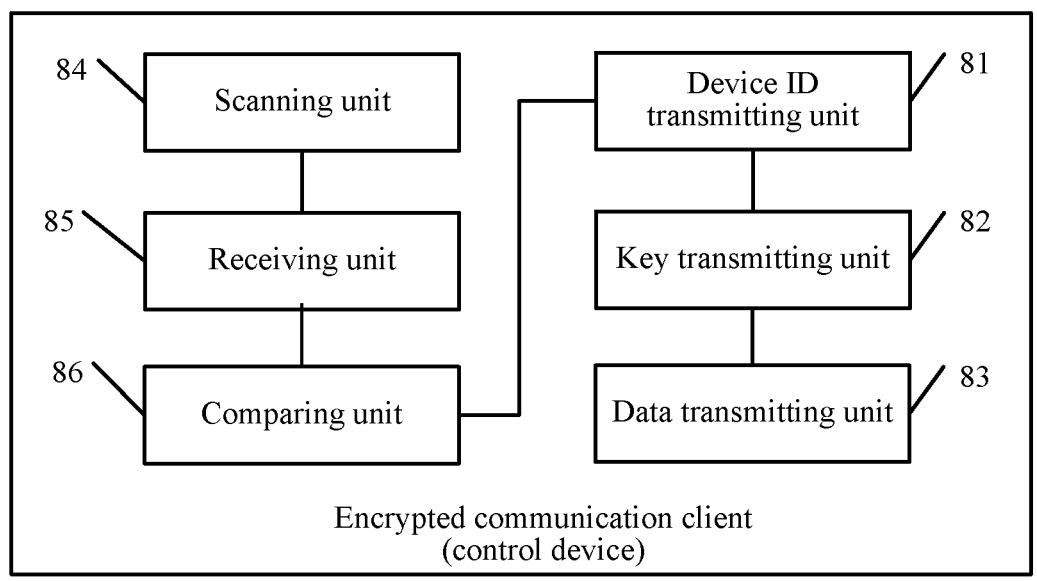
FIG. 9 is a schematic structural diagram of another encrypted communication client (control device) in accordance with some embodiments.

Optionally, as shown in FIG. 9, the client may further include:

a scanning unit 84, used to scan a graphic code displayed by a peripheral device, decrypt the graphic code to obtain code information, and then send the code information to a server;

a receiving unit 85, used to receive the device ID of the peripheral device sent by the server; and a comparing unit 86, used to receive a device ID of the peripheral device sent by the peripheral device; and then compare the device ID sent by the peripheral device with the device ID sent by the server.

The device ID transmitting unit 81 is further used to send the device ID of the peripheral device to the server.

Figure 10:
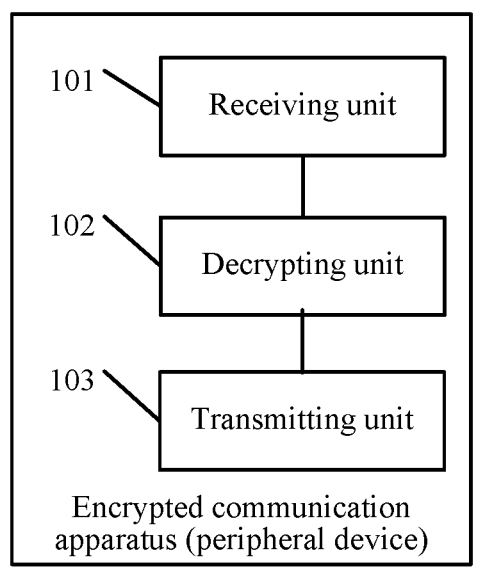
FIG. 10 is a schematic structural diagram of an encrypted communication apparatus (peripheral device) in accordance with some embodiments.

FIG. 10 is a schematic structural diagram of an encrypted communication apparatus in accordance with some embodiments. As shown in FIG. 10, the apparatus includes: a receiving unit 101, a decrypting unit 102, and a transmitting unit 103.

The receiving unit 101 is used to receive an encryption result sent by a client.

The decrypting unit 102 is used to decrypt the encryption result by using the first key obtained in advance to obtain the second key.

The transmitting unit 103 is used to encrypt communication data by using the second key to obtain encrypted communication data, and transmit the encrypted communication data.

Each of the apparatus shown in FIGS. 8-10 may be implemented by a device having processors, memory, and other components of the device shown in FIG. 7. Different modules may be implemented for the apparatus in FIG. 8-10 to provide the functions of the apparatus.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the application to the precise forms disclosed. Many modifications and variations are possible in view of the above teachings. The embodiments were chosen and described in order to best explain the principles of the application and its practical applications, to thereby enable others skilled in the art to best utilize the application and various embodiments with various modifications as are suited to the particular use contemplated.

What is claimed is:

1. A method of encrypting communication between a social network server and a peripheral device through a control device, comprising:

at the social network server having one or more processors and memory storing one or more programs to be executed by the one or more processors:

assigning a predetermined device ID and a corresponding pre-stored encryption key to the peripheral device;

establishing, using a database of the social network server, a mapping relationship between the predetermined device ID and the pre-stored encryption key;

after the establishing:

receiving a device registration request from the control device, the device registration request including: (1) the predetermined device ID of the peripheral device, (2) a user identifier of the control device assigned by the social network server, and (3) a request for a session key for encrypting communication between the peripheral device and the social network server;

in response to the device registration request:

associating the predetermined device ID with the user identifier;

identifying, from the database, the pre-stored encryption key based on the mapping relationship;

generating a first session key for encrypting and decrypting future communication between the peripheral device and the social network server;

encrypting the first session key using the pre-stored encryption key;

sending the encrypted first session key to the peripheral device via the control device, wherein the encrypted first session key is configured to be decrypted by the peripheral device using a local copy of the pre-stored encryption key;

encrypting communication from the social network server to the peripheral device in a respective communication session using the first session key; and sending the encrypted communication to the peripheral device through the control device, wherein the peripheral device decrypts the encrypted communication using the first session key that has been decrypted by the peripheral device using the local copy of the pre-stored encryption key.

2. The method of claim 1, further comprising:

after sending the encrypted first session key to peripheral device via the control device, receiving first communication that is sent from the peripheral device via the control device and encrypted with the first session key by the peripheral device, the first communication is accompanied by the predetermined device ID of the peripheral device;

based on the predetermined device ID accompanying the first communication, identifying the first session key in accordance with a stored association between the predetermined device ID and the first session key; and with the identified first session key, decrypting the first communication that is sent from the peripheral device via the control device.

3. The method of claim 1, further comprising:

in response to the session request, generating a second session key different from the first session key; and sending the second session key to the peripheral device via the control device, wherein the control device retains a copy of the second session key, and wherein the peripheral device encrypts at least part of the communication to the server using the second session key and the control device decrypts the respective at least part of the communication using the retained copy of the second session key.

4. The method of claim 1, further comprising:
in response to the session request, generating a second session key in addition to the first session key, wherein the first session key is configured to be capable of decrypting information encrypted using the second session key, and the second session key is configured to be incapable of decrypting information encrypted using the first session key;
sending the second session key to the control device; and
encrypting at least part of the communication to the peripheral device using the second session key, wherein the respective at least part of the communication is configured to be decrypted by the control device using the second session key and by the peripheral device using the first session key.

5. The method of claim 1, further comprising:
receiving a key updating request that is encrypted with the first session key and sent from the peripheral device via the control device, the key updating request including an updated encryption key corresponding to the predetermined device ID, and the key updating request is accompanied by the predetermined device ID of the peripheral device;
obtaining the updated encryption key corresponding to the predetermined device ID by decrypting the key updating request using the first session key; and
replacing the pre-stored encryption key with the update encryption key in the database.

6. The method of claim 1, further comprising:
receiving encrypted session communication from the peripheral device via the control device;
decrypting the session communication using the first session key;
selecting part of the session communication in accordance with predetermined criteria; and
sending the respective part of the session communication to the control device.

7. A social network server for encrypting communication between the social network server and a peripheral device through a control device, the social network server comprising one or more processors and memory storing one or more programs for execution by the one or more processors, the one or more programs including instructions for:
assigning a predetermined device ID and a corresponding pre-stored encryption key to the peripheral device;
establishing, using a database of the social network server, a mapping relationship between the predetermined device ID and the pre-stored encryption key;
after the establishing:
receiving a device registration request from the control device, the device registration request including: (1) the predetermined device ID of the peripheral device, (2) a user identifier of the control device assigned by the social network server, and (3) a request for a session key for encrypting communication between the peripheral device and the social network server;
in response to the device registration request:
associating the predetermined device ID with the user identifier;
identifying, from the database, the pre-stored encryption key based on the mapping relationship;
generating a first session key for encrypting and decrypting future communication between the peripheral device and the server;
encrypting the first session key using the pre-stored encryption key;
sending the encrypted first session key to the peripheral device via the control device, wherein the encrypted first session key is configured to be decrypted by the peripheral device using a local copy of the pre-stored encryption key; and
encrypting communication from the server to the peripheral device in a respective communication session using the first session key; and
sending the encrypted communication to the peripheral device through the control device, wherein the peripheral device decrypts the encrypted communication using the first session key that has been decrypted by the peripheral device using the local copy of the pre-stored encryption key.

8. The server of claim 7, the one or more programs further including instructions for:
after sending the encrypted first session key to peripheral device via the control device, receiving first communication that is sent from the peripheral device via the control device and encrypted with the first session key by the peripheral device, the first communication is accompanied by the predetermined device ID of the peripheral device;
based on the predetermined device ID accompanying the first communication, identifying the first session key in accordance with a stored association between the predetermined device ID and the first session key; and
with the identified first session key, decrypting the first communication that is sent from the peripheral device via the control device.

9. The server of claim 7, wherein the one or more programs further include instructions for:
in response to the session request, generating a second session key different from the first session key; and
sending the second session key to the peripheral device via the control device, wherein the control device retains a copy of the second session key, and wherein the peripheral device encrypts at least part of the communication to the server using the second session key and the control device decrypts the respective at least part of the communication using the retained copy of the second session key.

10. The server of claim 7, wherein the one or more programs further include instructions for:
in response to the session request, generating a second session key in addition to the first session key, wherein the first session key is configured to be capable of decrypting information encrypted using the second session key, and the second session key is configured to be incapable of decrypting information encrypted using the first session key;
sending the second session key to the control device; and
encrypting at least part of the communication to the peripheral device using the second session key, wherein the respective at least part of the communication is configured to be decrypted by the control device using the second session key and by the peripheral device using the first session key.

11. The server of claim 7, wherein the one or more programs further include instructions for:
receiving a key updating request that is encrypted with the first session key and sent from the peripheral device via the control device, the key updating request including an updated encryption key corresponding to the predetermined device ID, and the key updating request is accompanied by the predetermined device ID of the peripheral device;
obtaining the updated encryption key corresponding to the predetermined device ID by decrypting the key updating request using the first session key; and
replacing the pre-stored encryption key with the update encryption key in the database.

12. The server of claim 7, wherein the one or more programs further include instructions for:
receiving encrypted session communication from the peripheral device via the control device;
decrypting the session communication using the first session key;
selecting part of the session communication in accordance with predetermined criteria; and
sending the respective part of the session communication to the control device.

13. A non-transitory computer readable storage medium having instructions stored thereon, the instructions, when executed by one or more processors of a social network server, cause the social network server to perform operations comprising:
assigning a predetermined device ID and a corresponding pre-stored encryption key to a peripheral device;
establishing, using a database of the social network server, a mapping relationship between the predetermined device ID and the pre-stored encryption key;
after the establishing:
receiving a device registration request from the control device, the device registration request including: (1) the predetermined device ID of the peripheral device, (2) a user identifier of the control device assigned by the social network server, and (3) a request for a session key for encrypting communication between the peripheral device and the social network server;
in response to the device registration request:
associating the predetermined device ID with the user identifier;
identifying, from the database, the pre-stored encryption key based on the mapping relationship;
generating a first session key for encrypting and decrypting future communication between the peripheral device and the social network server;
encrypting the first session key using the pre-stored encryption key;
sending the encrypted first session key to the peripheral device via the control device, wherein the encrypted first session key is configured to be decrypted by the peripheral device using a local copy of the pre-stored encryption key; and
encrypting communication from the server to the peripheral device in a respective communication session using the first session key; and
sending the encrypted communication to the peripheral device through the control device, wherein the peripheral device decrypts the encrypted communication using the first session key that has been decrypted by the peripheral device using the local copy of the pre-stored encryption key.

14. The non-transitory computer readable storage medium of claim 13, wherein the operations further comprise:
after sending the encrypted first session key to peripheral device via the control device, receiving first communication that is sent from the peripheral device via the control device and encrypted with the first session key by the peripheral device, the first communication is accompanied by the predetermined device ID of the peripheral device;
based on the predetermined device ID accompanying the first communication, identifying the first session key in accordance with a stored association between the predetermined device ID and the first session key; and
with the identified first session key, decrypting the first communication that is sent from the peripheral device via the control device.

15. The non-transitory computer readable storage medium of claim 13, wherein the operations further comprise:
in response to the session request, generating a second session key different from the first session key; and
sending the second session key to the peripheral device via the control device, wherein the control device retains a copy of the second session key, and wherein the peripheral device encrypts at least part of the communication to the server using the second session key and the control device decrypts the respective at least part of the communication using the retained copy of the second session key.

16. The non-transitory computer readable storage medium of claim 13, wherein the operations further comprise:
in response to the session request, generating a second session key in addition to the first session key, wherein the first session key is configured to be capable of decrypting information encrypted using the second session key, and the second session key is configured to be incapable of decrypting information encrypted using the first session key;
sending the second session key to the control device; and
encrypting at least part of the communication to the peripheral device using the second session key, wherein the respective at least part of the communication is configured to be decrypted by the control device using the second session key and by the peripheral device using the first session key.

17. The non-transitory computer readable storage medium of claim 13, wherein the operations further comprise:
receiving a key updating request that is encrypted with the first session key and sent from the peripheral device via the control device, the key updating request including an updated encryption key corresponding to the predetermined device ID, and the key updating request is accompanied by the predetermined device ID of the peripheral device;
obtaining the updated encryption key corresponding to the predetermined device ID by decrypting the key updating request using the first session key; and
replacing the pre-stored encryption key with the update encryption key in the database.

18. The non-transitory computer readable storage medium of claim 13, wherein the operations further comprise:
receiving encrypted session communication from the peripheral device via the control device;
decrypting the session communication using the first session key;
selecting part of the session communication in accordance with predetermined criteria; and sending the respective part of the session communication to the control device.

\* \* \* \* \*